(12) United States Patent
Kaech et al.

(10) Patent No.: US 10,521,030 B2
(45) Date of Patent: Dec. 31, 2019

(54) TRANSFORMING A CONTROL STICK MOVEMENT SPACE

(71) Applicant: Microsoft Technology Licensing, LLC, Redmond, WA (US)

(72) Inventors: Miles Franz Kaech, Vancouver (CA); Curtis F. McClive, Kirkland, WA (US); Ross Anthony Nelson, Seattle, WA (US); Aaron J. Schmitz, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 50 days.

(21) Appl. No.: 15/867,617

(22) Filed: Jan. 10, 2018

(65) Prior Publication Data

US 2019/0212832 A1     Jul. 11, 2019

(51) Int. Cl.
*G06F 3/038*     (2013.01)
*G06F 3/0338*    (2013.01)
(Continued)

(52) U.S. Cl.
CPC .............. *G06F 3/038* (2013.01); *A63F 13/22* (2014.09); *G05G 9/047* (2013.01); *G06F 3/0338* (2013.01);
(Continued)

(58) Field of Classification Search
CPC ............ H01H 2221/012; G06F 3/0213; G06F 1/3259
See application file for complete search history.

(56) References Cited

U.S. PATENT DOCUMENTS 5,929,844 A * 7/1999 Barnes ................ G06F 3/04815
                                                      345/156
5,963,195 A   10/1999 Gregg et al.
(Continued)

FOREIGN PATENT DOCUMENTS

CA           2147575 A1   10/1996

OTHER PUBLICATIONS

"Doing Thumbstick Dead Zones Right", Retrieved From <<http://www.third-helix.com/2013/04/12/doing-thumbstick-dead-zones-right.html>>, Apr. 12, 2013, 7 Pages.
(Continued)

*Primary Examiner* — Chad M Dicke
(74) *Attorney, Agent, or Firm* — Alleman Hall Creasman & Tuttle LLP

(57) ABSTRACT

Examples are disclosed that relate to computing devices and methods for transforming output of a control stick. In one example, a method comprises: receiving a dead zone inflection point defining a boundary of a dead zone region and a playspace region within a first normalized unit-area movement space of the control stick, mapping the first normalized unit-area movement space to a second normalized unit-area movement space, using a scaling function comprising the dead zone inflection point, scaling each axis of the second normalized unit-area movement space to generate a scaled second normalized unit-area movement space, transforming the scaled second normalized unit-area movement space to a scaled first normalized unit-area movement space, receiving position data representing a current position of the control stick, and transforming the current position to a transformed position in the scaled first normalized unit-area movement space.

20 Claims, 7 Drawing Sheets

(51) Int. Cl.
*G06F 3/0362* (2013.01)
*G05G 9/047* (2006.01)
*A63F 13/22* (2014.01)

(52) U.S. Cl.
CPC ........ *G06F 3/0362* (2013.01); *A63F 2300/10* (2013.01); *A63F 2300/1018* (2013.01); *A63F 2300/6045* (2013.01); *G06F 3/0383* (2013.01)

(56) References Cited

U.S. PATENT DOCUMENTS

| | | | |
|---|---|---|---|
| 5,963,196 A | 10/1999 | Nishiumi et al. | |
| 6,053,814 A * | 4/2000 | Pchenitchnikov | A63F 13/06 273/148 B |
| 6,203,432 B1 | 3/2001 | Roberts et al. | |
| 6,580,418 B1 * | 6/2003 | Grome | G05G 9/047 345/161 |
| 8,050,891 B2 * | 11/2011 | Podoloff | G06F 3/01 702/191 |
| 8,133,119 B2 | 3/2012 | Finocchio | |
| 8,264,458 B2 | 9/2012 | Cooper et al. | |
| 8,730,166 B2 * | 5/2014 | Larsen | A63F 13/214 345/161 |
| 10,000,909 B2 * | 6/2018 | Mueller | G05G 9/047 |
| 2004/0222965 A1 | 11/2004 | Riccomini et al. | |
| 2005/0255918 A1 | 11/2005 | Riggs et al. | |
| 2007/0188458 A1 | 8/2007 | Bells et al. | |
| 2010/0100359 A1 | 4/2010 | Podoloff et al. | |
| 2013/0100021 A1 | 4/2013 | Larsen et al. | |
| 2014/0024110 A1 | 1/2014 | Knofe et al. | |
| 2017/0255279 A1 | 9/2017 | McClive et al. | |
| 2017/0285848 A1 * | 10/2017 | Rosenberg | G06F 3/0202 |

OTHER PUBLICATIONS

Dicianno, et al., "Joystick Control for Powered Mobility: Current State of Technology and Future Directions", In Journal of Physical medicine and rehabilitation clinics of North America, vol. 21, Issue 1, Feb. 28, 2010, 8 Pages.

Lienhard, Samantha, "You Can Now Alter the Gta V Shooting "Deadzone"", Retrieved From <<http://www.gta5cheats.com/can-now-alter-gta-v-shooting-deadzone/>>, Dec. 19, 2014, 3 Pages.

"International Search Report and Written Opinion Issued in PCT Application No. PCT/US18/066339", dated Mar. 22, 2019, 13 Pages.

* cited by examiner

TRANSFORMING A CONTROL STICK MOVEMENT SPACE

BACKGROUND

User input devices may be used to provide input to computing devices. Some user input devices utilize one or more control sticks that include mechanical and electrical components to generate position values in one or more directional axes. Some user input devices or systems that receive input from such devices may employ a central dead zone in which the position of the control stick is ignored.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to devices and methods for transforming output of a control stick. In one example, a method comprises: receiving a dead zone inflection point defining a boundary of a dead zone region and a playspace region within a first normalized unit-area movement space of the control stick, mapping the first normalized unit-area movement space to a second normalized unit-area movement space, using a scaling function comprising the dead zone inflection point to scale each axis of the second normalized unit-area movement space to generate a scaled second normalized unit-area movement space, transforming the scaled second normalized unit-area movement space to a scaled first normalized unit-area movement space, receiving position data representing a current position of the control stick, and transforming the current position to a transformed position in the scaled first normalized unit-area movement space.

DETAILED DESCRIPTION

User input devices that include one or more control sticks may be used to provide input to a variety of devices, such as video game consoles, vehicles and other machines (robots, unmanned aircraft (e.g., drones), etc.). The control sticks typically include mechanical and electrical components to generate position values in one or more directional axes. In some systems, a central dead zone may be employed in a movement space of position values. For example, a video game may define a central dead zone within the movement space. When the control stick is located in the dead zone, the position of the control stick reported to the game is ignored. In some examples, the position values of the control stick reported by the device may be adjusted to compensate for a dead zone or another sensitivity region in the movement space.

Figure 1:
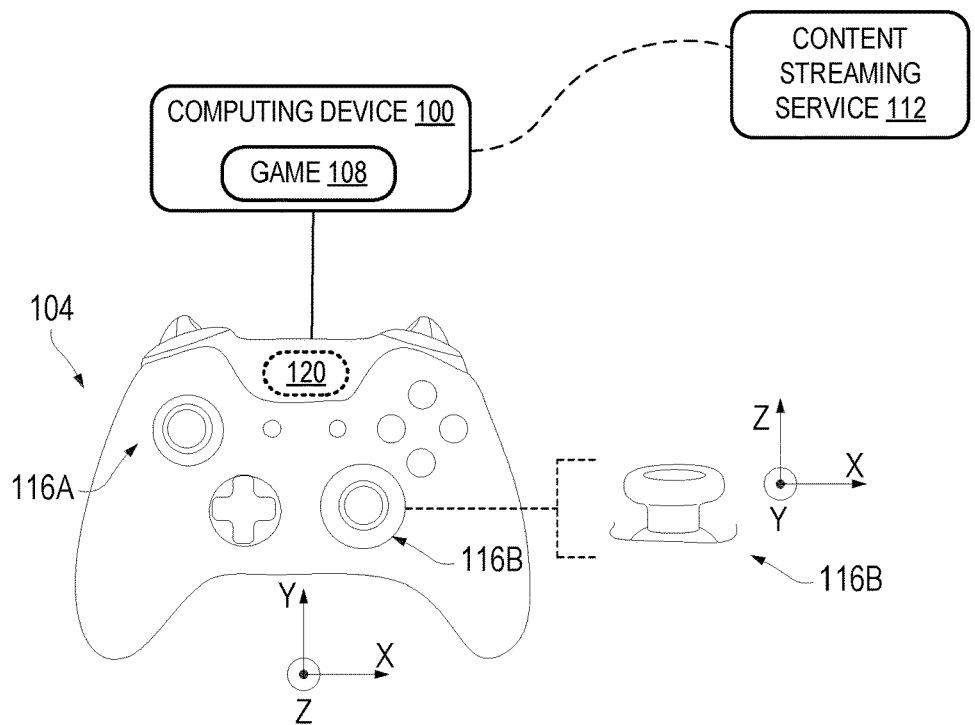
FIG. 1 shows an example of a user input device including a plurality of control sticks according to examples of the present disclosure.

With reference now to FIG. 1, in one example a user may provide input to a computing device 100, such as a gaming console, smart TV or the like, through a user input device in the form of a controller 104. The controller 104 may comprise a plurality of user-actuatable input components by which a user may interact with, for example, a video game 108 or other application or content executing on or provided by the computing device 100, or provided by a remote content streaming service 112.

In some examples, the user-actuatable input components of the controller 104 may include one or more control sticks in the form of a left thumbstick 116A and/or a right thumbstick 116B. Each of the thumbsticks 116A, 116B is a user-actuatable input component that may be manipulated by a user's thumb (or other digit) along two or more axes for controlling or otherwise interacting with a machine, computing device, computer program such as a video game or other application, etc.

In some examples, each of the thumbsticks 116A and 116B may interact with control-activation sensors in the form of potentiometers. The potentiometers use continuous electrical activity to provide an analog input control signal based on a position of the thumbstick relative to a default position. Other examples of control-activation sensors may include dome switches, tactile switches, Hall effect and other magnetic sensors, capacitive sensors, optical sensors, and other electronic sensing components.

The controller 104 may be communicatively coupled to computing device 100 via a wired or wireless connection. As described in more detail below, the output of a control stick of controller 104 may be transformed by modifying control signals generated by the control stick. In some examples and as described below, such modifications may be performed by computing device 100. For example, computing device 100 may comprise a processor configured to transform output of a control stick as described herein. In other examples, such modifications may be performed locally on a computing device 120 integrated into controller 104. Additional details regarding the components and computing aspects of computing device 100 and computing device 120 are described in more detail below with reference to FIG. 9.

It will be appreciated that the video game controller 104 and user-actuatable input components described above are merely examples provided for illustrative purposes. In other examples, other user input devices comprising different types and/or combinations of control sticks and other user-actuatable input components may be utilized.

Figure 2:
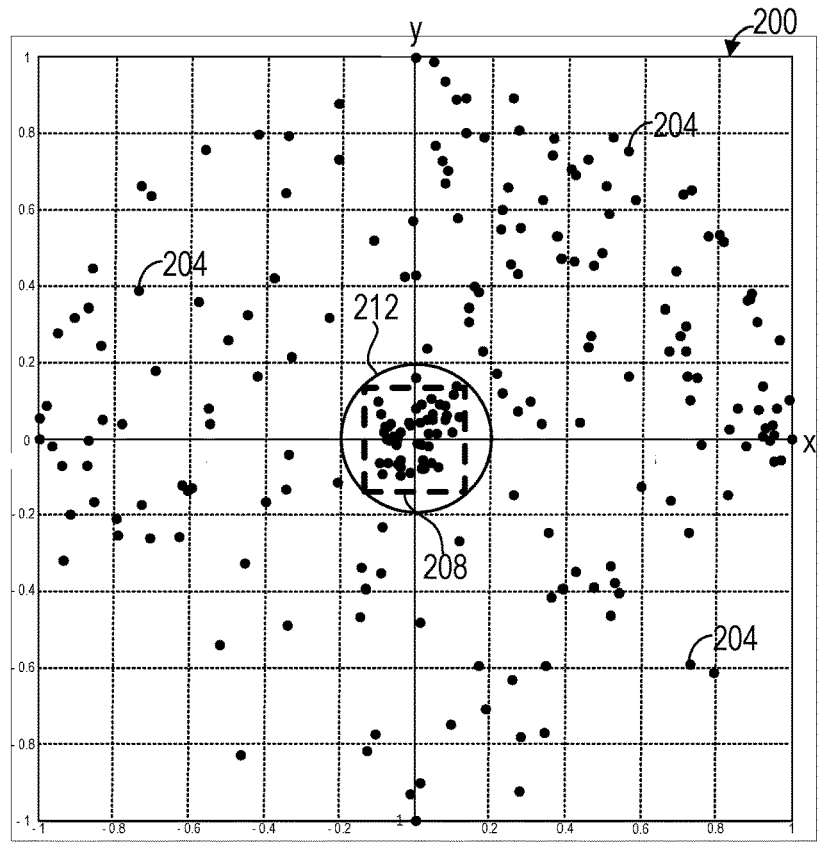
FIG. 2 shows an example plot of positions of a control stick according to examples of the present disclosure.

With reference now to FIG. 2, in some examples control stick mechanisms may have limited precision and repeatability. For example, and with reference to thumbstick 116B of FIG. 1, when a user is not engaging the thumbstick, the thumbstick may return to a central resting position by means of springs, bands, motors, servos or other suitable return elements. The resting position can vary over time within a device, or may vary from device-to-device depending upon manufacturing variability, component variation, wear of components, and other factors.

In the example of FIG. 2, a current position of thumbstick 116B may be reported as a pair of coordinates represented by a point 204 within a two-dimensional first normalized unit-area movement space 200. FIG. 2 shows a plurality of points 204 representing example thumbstick positions/coordinate pairs. In the example of FIG. 2, the two-dimensional movement space 200 is normalized to have a maximum absolute value of 1 along each axis. Valid positions may occur on increments of a predetermined size or range, such as 0.05. In the example of FIG. 1, a position of thumbstick 116B along the x-axis corresponds to a coordinate on the x-axis in first normalized unit-area movement space 200 of FIG. 2, and a position of thumbstick 116B along the y-axis corresponds to a coordinate on the y-axis in the first normalized unit-area movement space 200.

In operation and when released, thumbstick 116B may return to a location that does not exactly match the ideal center position when it is not engaged by a user. A distribution of these different return locations may define a return-to-center region within which the thumbstick 116B will likely settle when released. The distribution of different return locations and the size and shape of the corresponding return-to-center region may vary from one user input device to another. FIG. 2 shows one example of a return-to-center region 208 in the shape of a square. In different examples, other sizes and shapes of return-to-center regions may be defined.

The distribution of different return locations in a return-to-center region can make it difficult for a system to determine whether the thumbstick 116B is idle or not (e.g., whether a user is deflecting the thumbstick). In one example, a video game may address this issue by defining a "dead zone" within the first normalized unit-area movement space 200. By implementing a dead zone, any position of the thumbstick 116B within the dead zone is considered idle. The position of the thumbstick 116B may be recognized as user input by the game once the thumbstick 116B exits the dead zone. With reference again to FIG. 2, one example of a circular dead zone region 212 centered at (0,0) is illustrated. In other examples, dead zone regions may have a variety of shapes and sizes.

Dead zone implementations may vary significantly among different games and other applications and devices receiving thumbstick input. For example, the size and shape of a dead zone region may vary from one game to another. Further, and as noted above, the distribution of different return locations and corresponding return-to-center regions also can vary from one user input device to another. This, in turn, can lead to a mismatch between a particular dead zone region and the return-to-center region of a given device.

Such mismatches between a dead zone and a return-to-center region may result in errors in the performance of the user input device, computing device and/or software executed on the computing device. In some examples and to partially address these issues, the dead zone of a video game or other application or device may be designed larger than the anticipated return-to-center regions of input devices with which it may be used. In this way, for example, a video game may attempt to ensure that its dead zone will encompass the return-to-center regions of a variety of controllers with which it may be used.

However, a dead zone region larger than a return-to-center region of an input device produces a sensitivity problem for the user. For example, and with reference to FIG. 1, a user may deflect thumbstick 116B a certain distance from the center to outside the dead zone before any response is registered by the game. This lack of immediate response can impair the user's gameplay performance, especially when a small in-game response is desired.

On the other hand, a dead zone that is smaller than a return-to-center region is also undesirable. For example, if thumbstick 116B comes to rest at a position outside the dead zone, the game will respond as if the user deflected the thumbstick, even if the thumbstick is idle. This results in the user experiencing a game response when none was expected.

In some examples, a system may address problems associated with mismatches between the dead zone and the return-to-center region by mathematically transforming the first normalized unit-area movement space 200 based on the dead zone, and reporting the current position of the control stick in a scaled normalized unit-area movement space. In some examples, a scaling function for each axis of movement of the control stick may be utilized. In other words, a scaling function for the x-axis position and a scaling function for the y-axis position of the control stick may be utilized. In different examples the two scaling functions may be the same or different functions. In this manner, a scaled position along each axis of control stick movement may be provided.

Figure 3:
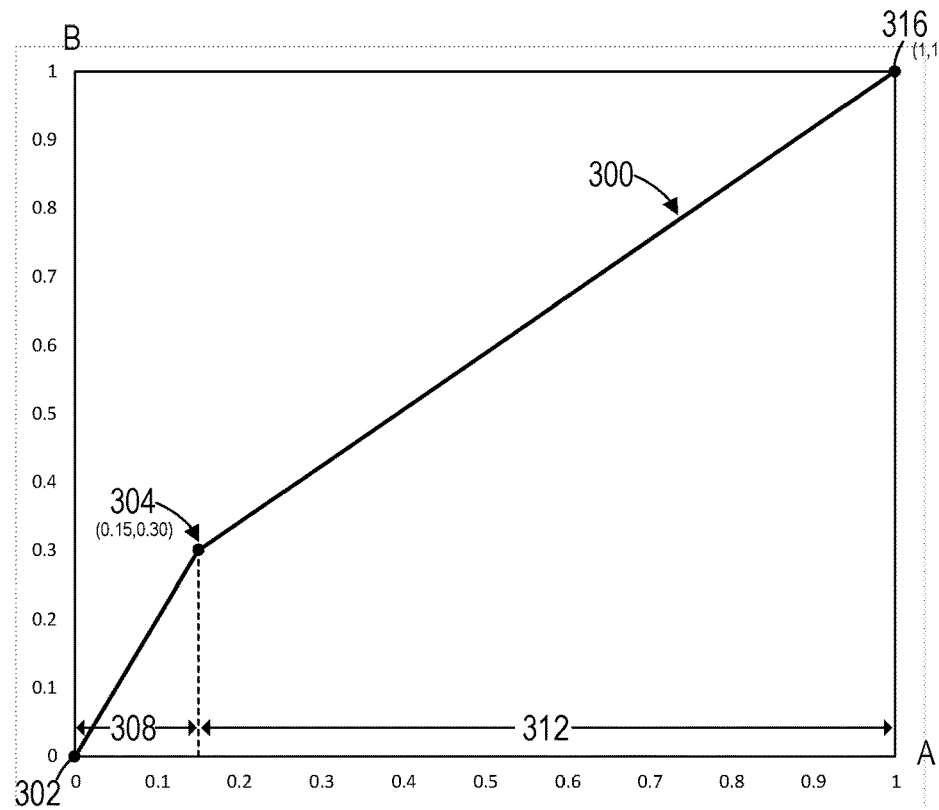
FIG. 3 shows an example plot of a scaling function for one axis of movement comprising a dead zone inflection point.

FIG. 3 shows one example of a scaling function that may be applied to positions of a control stick along one axis of movement of the control stick. In the example of FIG. 3, the scaling function 300 is plotted as a piecewise linear function on an A-axis and a B-axis. A coordinate of the current position of thumbstick 116B along one axis of control stick movement within a normalized movement space, such as the x-axis, may be received as an input variable on the A-axis of the scaling function 300.

The scaling function 300 then outputs a scaled position along the B-axis, which corresponds to a scaled position along the x-axis of movement in the normalized two-dimensional movement space. In some examples, scaling function 300 also may be used to scale positions of thumbstick 116B along the y-axis.

The scaling function 300 illustrated by example in FIG. 3 comprises a dead zone inflection point 304. The A-axis coordinate of the dead zone inflection point 304 may be a position along a given axis of movement of the thumbstick 116B, such as the x-axis, that represents an outer edge of the return-to-center region of the thumbstick in the positive direction of the thumbstick. The B-axis coordinate of the dead zone inflection point 304 may be a position along the same axis of movement that represents the edge of a game's dead zone region in the positive direction. Thus, at the dead zone inflection point 304, the scaling function 300 scales a position coordinate of thumbstick 116B at the edge of the thumbstick's return-to-center region to correspond to the edge of the game's dead zone region.

In the example of FIG. 3, the coordinates of the dead zone inflection point 304 are (0.15, 0.3). In this manner and for example, when the thumbstick 116B is at an x-axis position of 0.15, this position is transformed and reported as 0.3. In other examples, the scaling function 300 may be rotated 180 degrees about the origin to provide a corresponding output of the scaling function 300 for negative input coordinates. Accordingly, and as described in more detail below, the dead zone inflection point 304 defines a boundary of a dead zone region and a playspace region within a movement space of the control stick.

With reference again to FIG. 3, the scaling function 300 comprises a first sub-function continuous between an origin 302 and the dead zone inflection point 304, and a second sub-function continuous from the dead zone inflection point 304 to a maximum point 316. In this example, the dead zone inflection point 304 defines the boundaries of a dead zone region 308 along one axis of movement of a control stick. Within the dead zone region 308, position values of the control stick are transformed to fit within the game's dead zone. As explained above, any position values falling between the origin 302 and the dead zone inflection point 304 are ignored or not recognized by the game or other application implementing the dead zone region 308.

The area outside of the dead zone region 308, referred to herein as the playspace region, is the area in which the position of the control stick is recognized by and/or elicits a response from the game or other application. In the example of FIG. 3, the playspace region 312 comprises the segments of the scaling function 300 between the dead zone inflection point 304 and the maximum point 316. The maximum point 316 represents the maximum magnitude of the position of thumbstick 116B in a positive direction on a given axis.

The scaling function 300 also may comprise one or more additional sensitivity inflection points within the playspace region. By adding a sensitivity inflection point, a user may customize and control the sensitivity of a control stick outside of the dead zone region.

A general expression of scaling function 300 may be described as follows: let A be the input variable and B the output value. For simplicity, all points P and Q are referred to in this example by their A-axis coordinate. One or more sub-functions F are defined to interpolate between the points:

$$B = \begin{cases} F(A, Q_1, P_{dz}), & Q_{1A} \le A < P_{dzA} \\ F(A, P_{dz}, Q_2), & P_{dzA} \le A \le Q_{2A} \end{cases}$$

where $Q_1 = (Q_{1A}, Q_{1B}) =$ origin 302: (0,0),
$Q_2 = (Q_{2A}, Q_{2B}) =$ maximum point 316, and
$P_{dz} = (P_{dzA}, P_{dzB}) =$ dead zone inflection point 304.

With reference again to FIG. 3, the sub-functions defining the dead zone region 308 and other sensitivity regions that may be included in the playspace region 312 each have a slope that defines the sensitivity of the thumbstick 116B within that region. For example, the dead zone region 308 has a slope greater than 1.0. In this region, a narrow range of input values, from 0 to 0.15, is scaled into a larger range of output values, from 0 to 0.3. This has the effect of moving the user outside of the dead zone region 308 and into the playspace region with less displacement of the thumbstick 116B than if the input values were left unscaled. In other examples, the slope or derivatives of the scaling function may be configured to scale the position of the thumbstick 116B differently.

In some examples, one or more transformation parameters of a control stick may be determined during a manufacturing process for the control stick and may be stored in the corresponding user input device. In this manner, the stored parameter(s) may be utilized to determine a scaling function as described above. For example, a dead zone inflection point may be based at least in part on a stored return-to-center region comprising a coordinate representing the outer boundary of the return-to-center region of the control stick. In this manner, a stored return-to-center region may be used to inform the firmware of a gaming console of the individual controller's hardware characteristics.

In some examples, one or more transformation parameters may be set based on a calibration application or process performed by a user of the controller. For example, a user may run a process to choose a transformation that may match the topology of a game's dead zone. In some examples, one or more coordinates of a dead zone inflection point may be updated during a runtime calibration process.

With some user input devices, the distribution of points where the control stick comes to rest may change during operation due to, for example, mechanical variation of the control stick mechanism. To address such variations, the return to center region may comprise an adaptive size that may be updated as the control stick is in use. The motion of the control stick may be sampled while the control stick is in use to update a group of resting points that comprise the return to center region, or to establish a new distribution of resting points. In this manner, coordinates of the dead zone inflection point, such as the size of the return-to-center region, may be updated to more closely match changes in the control stick mechanism over time.

In some examples, receiving one or more transformation parameters, such as one or more coordinates of a dead zone inflection point, may include receiving parameters as game behavior changes to ensure that control stick behavior is optimized for the current settings. For example, when an aspect of a video game changes, such as when a user advances to a new level of play, a video game console may send an updated dead zone shape and size to the controller and/or associated computing device.

Some examples of applying such scaling, such as using scaling function 300 of FIG. 3, may be useful in situations where a dead zone may be implemented along the full stroke of both axes of a movement space. However, scaling function 300 may distort values along the perimeter of the movement space.

For example, consider a unit circle with a radius of 1. The cartesian coordinates of a point, on the circumference of the circle along the positive domain of the diagonal where y=x, are $$\left(\frac{\sqrt{2}}{2}, \frac{\sqrt{2}}{2}\right),$$

or approximately (0.71, 0.71). Applying the scaling function 300 to this point, for example, produces a coordinate at approximately (0.76, 0.76). In this example, the point is pushed farther out than in the untransformed space. This may result in a larger output than a user of the thumbstick 116B intends. In another example, points along the diagonal may be scaled closer to the origin, lessening a magnitude of the response to deflecting the thumbstick 116B. As a result, the user of the thumbstick 116B may not observe a full response even when fully deflecting the thumbstick 116B.

Figure 4:
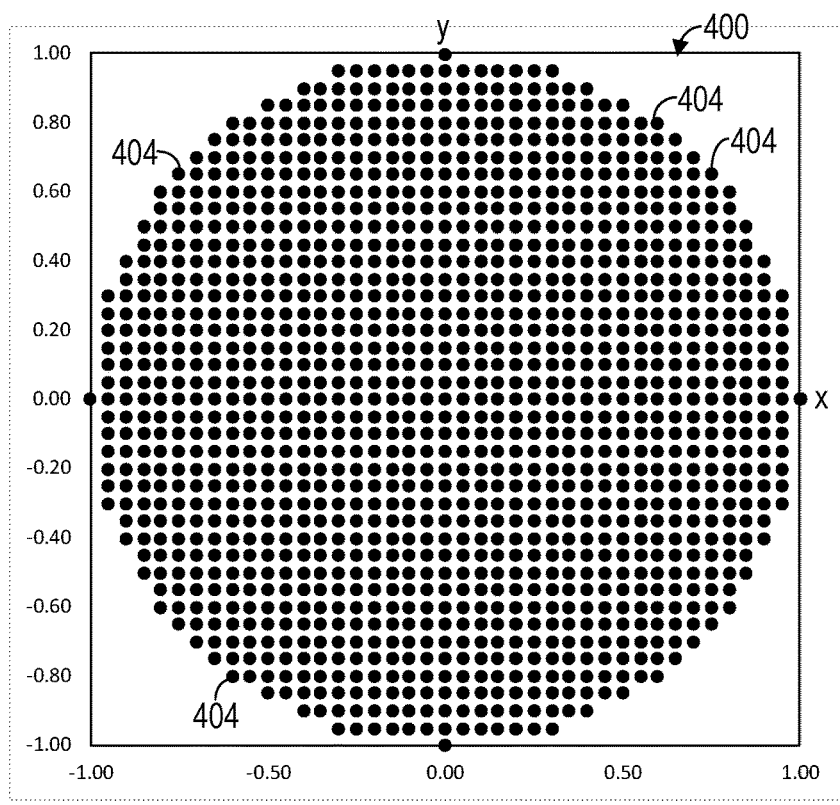
FIG. 4 shows an example plot of possible positions reported by a control stick along two axes of movement within a first normalized unit-area movement space.

To address such issues, in some examples a first normalized unit-area movement space may be mapped to a second normalized unit-area movement space prior to scaling each axis of the movement space. In one example, illustrated in FIG. 4, the possible positions 404 reported by thumbstick 116B within a first normalized unit-area movement space 400 may be mapped into a second normalized unit-area movement space prior to scaling the positions 404 using a scaling function, such as scaling function 300 of FIG. 3. FIG. 4 illustrates all the possible positions 404 reported by thumbstick 116B within the first normalized unit-area movement space 400. In some examples, positions 404 have a fixed resolution or step size between possible positions. In this example, the thumbstick 116B reports positions along each axis on the range from −1.00 to 1.00, where 0.00 is the center idle position, and valid positions occur on increments of 0.05.

Figure 5:
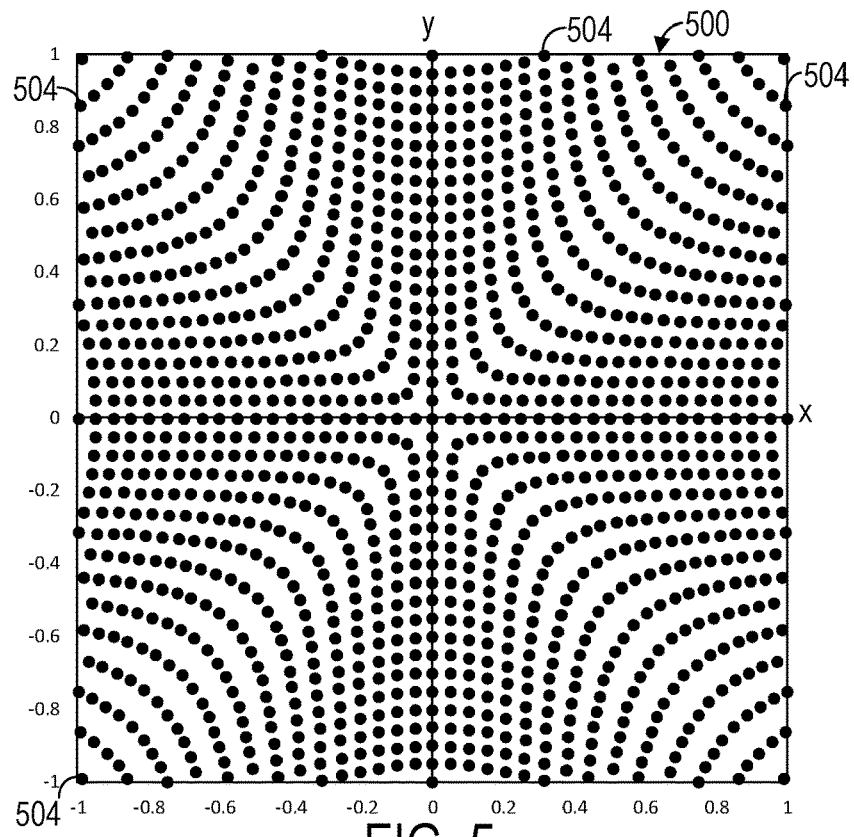
FIG. 5 shows the example plot of possible positions of a control stick of FIG. 4 mapped to a second normalized unit-area movement space according to examples of the present disclosure.

With reference now to FIG. 5, this example illustrates the results of mapping the possible positions 404 of the circular first normalized unit-area movement space 400 of FIG. 4 to a second (squared) normalized unit-area movement space 500. Mapping the first normalized unit-area movement space 400 to the second normalized unit-area movement space 500 may comprise multiplying one or more coordinates of a point 404 in the first normalized unit-area movement space 400 of FIG. 4 by a scale factor.

In one example, a general expression of one such scale factor S may be described as follows, where all points 404 within the first normalized unit-area movement space 400 represent a possible current position of thumbstick 116B, and each point 404 comprises an x-axis coordinate and a y-axis coordinate:

$$S = \begin{cases} 1.0, & x = 0 \text{ or } y = 0 \\ \sqrt{1 + \frac{x^2}{y^2}}, & \text{abs}(x) < \text{abs}(y) \\ \sqrt{1 + \frac{y^2}{x^2}}, & \text{abs}(y) \leq \text{abs}(x) \end{cases}$$

In this example, the scale factor S has a value of one when any of the coordinates of the point 404 has a value of zero. Additionally, when the absolute value of the x-axis coordinate of a point 404 is less than the absolute value of the y-axis coordinate of the point 404, the scale factor S comprises the square root of: the sum of one plus the squared x-coordinate divided by the squared y-coordinate. When the absolute value of the y-axis coordinate is less than or equal to the absolute value of the x-axis coordinate, the scale factor comprises the square root of: the sum of one plus the squared y-coordinate divided by the squared x-coordinate.

In other examples, the scale factor S may be calculated using the angle θ from a cardinal x or y axis of the first normalized unit-area movement space 400 to the point 404. In one example, the first normalized unit-area movement space 400 may be divided into eight equal slices at intervals of π/4 radians or 45 degrees, starting from the origin, (0,0), along the positive domain of the x-axis (zero or 2π radians) and continuing counterclockwise. For any point 404 in the first normalized unit-area movement space 400, the positive angle θ may be determined between the point 404, the origin and the nearest cardinal x-axis or y-axis.

In this manner, the angle θ may have a minimum value of zero radians along the cardinal x-axis or y-axis. The angle θ may have a maximum value of π/4 radians when the point 404 is on any of the diagonals at π/4 radians, 3π/4 radians, etc.

The scale factor S may be calculated as the reciprocal cosine of the angle θ. In this manner, the scale factor may have a minimum value of 1 for points 404 along the cardinal x-axis or y-axis, and the scale factor may have a maximum value of √2 for points 404 on any of the diagonals at π/4 radians, 3π/4 radians, etc.

In these examples, scale factors may be calculated to map the circular first normalized unit-area movement space 400 to the square second normalized unit-area movement space 500. It will be noted that any other suitable normalized unit area movement space may be used, and any suitable scale factor S may be used to map the first normalized unit-area movement space to the second normalized unit-area movement space.

As previously described, one or more coordinates of one or more points 404 in the first normalized unit-area movement space 400 may be multiplied by the scale factor to map the one or more points to one or more points 504 in the second normalized unit-area movement space 500. A general expression of one example of implementing the scale factor may be described as follows, where T represents the transformed position 504 of thumbstick 116B within the second normalized unit-area movement space 500, S represents the scale factor, and P represents the initial position 404 within the first normalized unit-area movement space 400:

$$T = S * P$$

With reference now to the example of FIG. 5, applying this transformation to each of the possible positions reported by thumbstick 116B in FIG. 4 results in the transformed positions 504 within the second normalized unit-area movement space 500.

Figure 6:
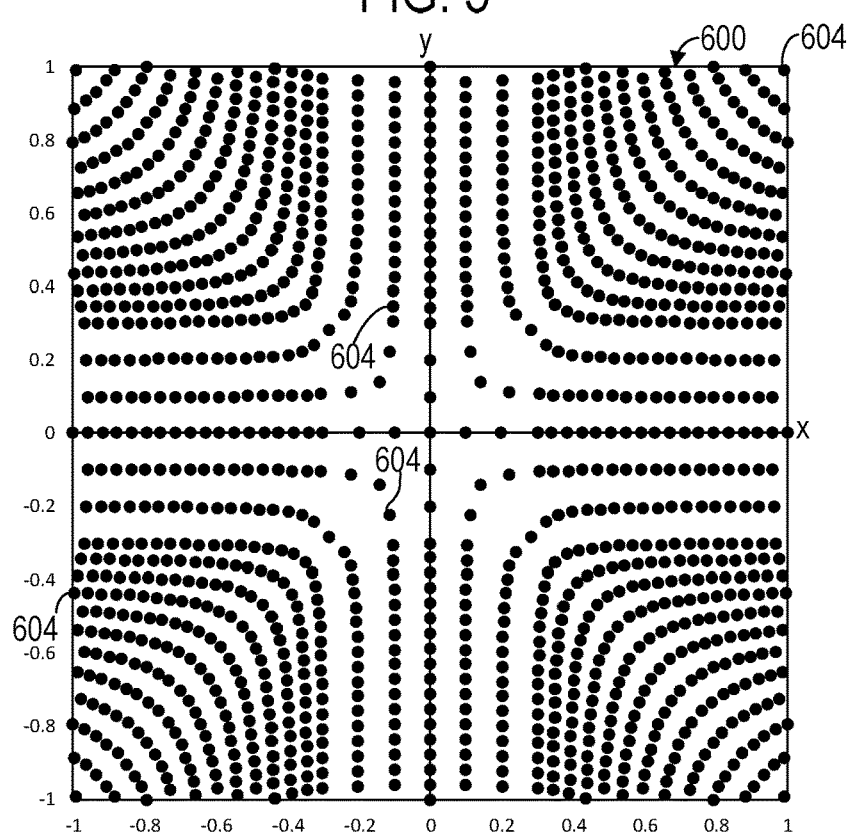
FIG. 6 shows the example plot of the possible positions of a control stick of FIG. 5 in a scaled second normalized unit-area movement space according to examples of the present disclosure.

With reference now to FIG. 6, after mapping the first normalized unit-area movement space 400 to the second normalized unit-area movement space 500, the second normalized unit-area movement space may be scaled using a scaling function comprising a dead zone inflection point to generate a scaled second normalized unit-area movement space 600. In the example of FIG. 6, the scaling function comprises the piecewise scaling function 300 of FIG. 3.

As shown in the example of FIG. 6, the possible positions 604 of thumbstick 116B are plotted as the result of applying the scaling function 300 from FIG. 3 to each axis of the second normalized unit-area movement space 500 independently. For example, the steeper slope of the scaling function 300 within the dead zone region 308 manifests as wider spacing between positions 604 within the dead zone region, from −0.3 to 0.3 along each axis in FIG. 6.

In another example, scaling the second normalized unit-area movement space 500 to generate the scaled second normalized unit-area movement space 600 may comprise scaling a first axis of the second normalized unit-area movement space using a first scaling function comprising a first dead zone inflection point, and scaling a second axis of the second normalized unit-area movement space using a second scaling function comprising a second dead zone inflection point. In this manner, axis-independent scaling may be provided.

Figure 7:
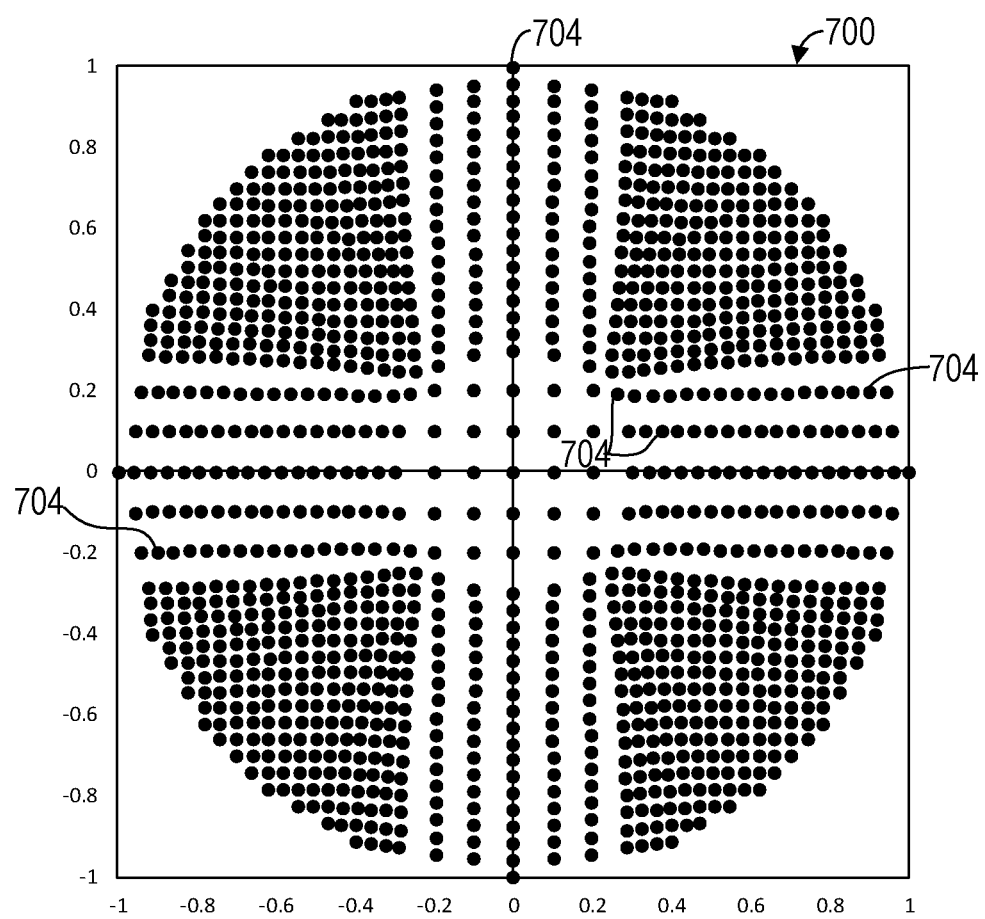
FIG. 7 shows the example plot of the possible positions of a control stick of FIG. 6 transformed to a scaled first normalized unit-area movement space according to examples of the present disclosure.

With reference now to FIG. 7, after scaling the second normalized unit-area movement space 500 to generate the scaled second normalized unit-area movement space 600, the scaled second normalized unit-area movement space may be transformed back into a scaled first normalized unit-area movement space 700. In the example of FIG. 7, all possible positions 704 of thumbstick 116B are plotted within the scaled first normalized unit-area movement space 700.

Transforming the scaled second normalized unit-area movement space 600 to the scaled first normalized unit-area movement space 700 may comprise dividing one or more coordinates of a point 604 in the scaled second normalized unit-area movement space 600 by a scale factor. Examples of scale factors may be calculated as described above.

In some examples, the scale factor that may be used to transform the scaled second normalized unit-area movement space to a scaled first normalized unit-area movement space may be calculated using the same formula as the scale factor S calculated to map the circular first normalized unit-area movement space 400 to the square second normalized unit-area movement space 500. It will be noted that any other suitable normalized unit area movement space may be used, and any suitable scale factor may be used to transform the scaled second normalized unit-area movement space to a scaled first normalized unit-area movement space.

As noted above, one or more coordinates of one or more points 604 in the scaled second normalized unit-area movement space 600 may be divided by a scale factor to transform the one or more points 604 to one or more points 704 in the scaled first normalized unit-area movement space 700. A general expression of one example of implementing the scale factor may be described as follows, where $T_S$ represents the position 604 of the thumbstick 116B within the scaled second normalized unit-area movement space 600, $S_2$ represents the scale factor, and P' represents the output position 704 within the scaled first normalized unit-area movement space 700:

$$P' = T_S/S_2$$

In the example of FIG. 7, the scale factor $S_2$ is derived using the same function that determined the scale factor S used to map the circular first normalized unit-area movement space 400 to the square second normalized unit-area movement space 500. Accordingly, applying this transformation results in the scaled first normalized unit-area movement space 700 taking the form of a circular movement space like the circular first normalized unit-area movement space 400.

Additionally, by utilizing the sequence of mapping and scaling functions described above, the scaled first normalized unit-area movement space 700 may preserve the circular perimeter of the first normalized unit-area movement space 400. For example, the coordinates of the point along the diagonal in the movement space 400 of FIG. 4, $$\left(\frac{\sqrt{2}}{2}, \frac{\sqrt{2}}{2}\right),$$

map to the point (1, 1) in the movement space 500 of FIG. 5. Scaling the point (1, 1) using the scaling function 300 preserves the coordinates (1, 1) in the movement space 600 of FIG. 6. Transforming this point 604 to the scaled second normalized unit-area movement space 700 returns the coordinates $$\left(\frac{\sqrt{2}}{2}, \frac{\sqrt{2}}{2}\right),$$

the same coordinates as in the perimeter of the movement space 400.

In this manner, the behavior of thumbstick 116B along the perimeter of the scaled first normalized unit-area movement space 700 may be preserved to match or substantially match behavior at corresponding positions along the perimeter of the (unsealed) first normalized unit-area movement space 400. Accordingly, unexpected distortions in reported positions at the diagonals and perimeter of the thumbstick's movement space may be avoided.

Figure 8A:
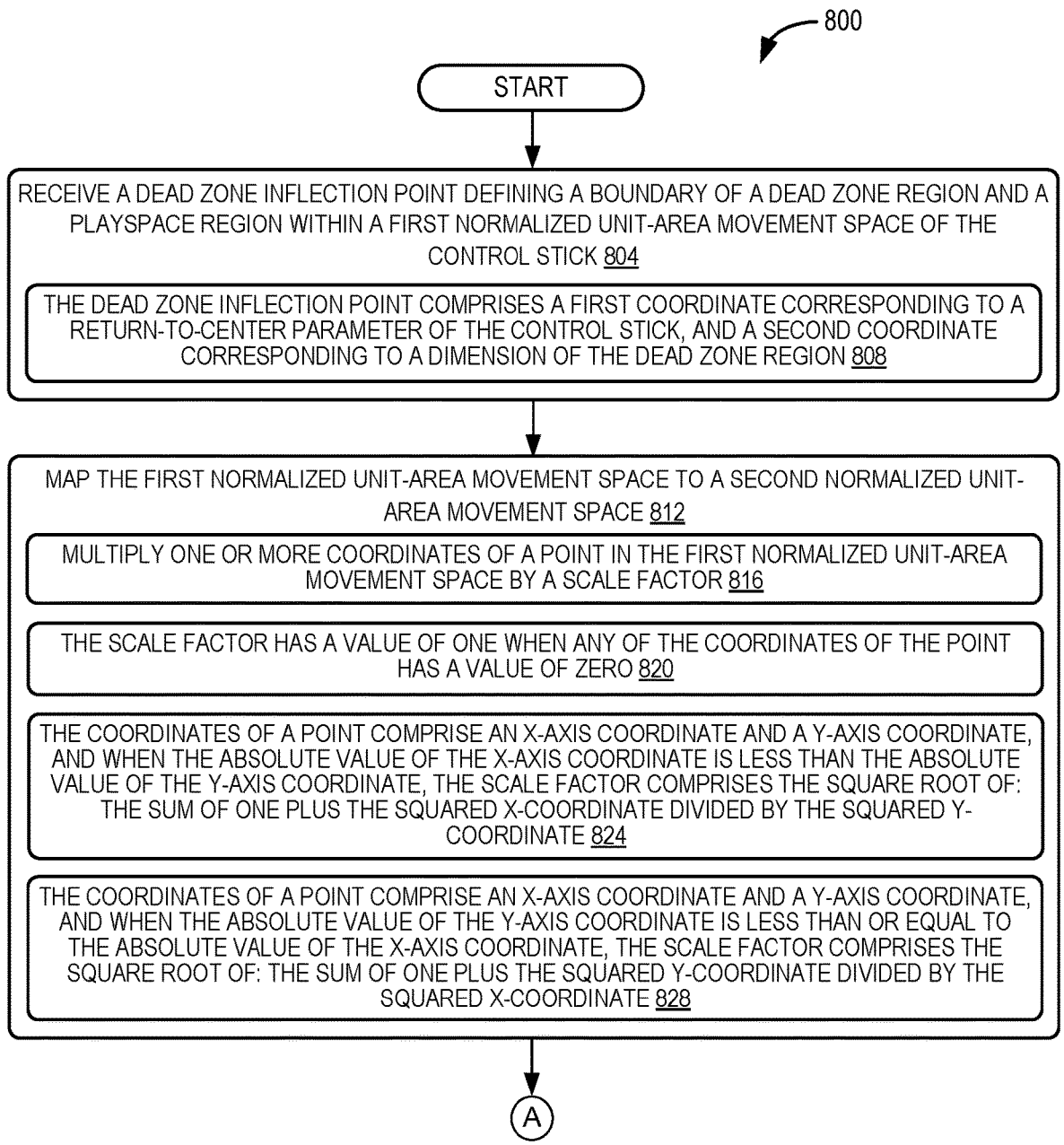
FIGS. 8A and 8B show a block diagram of a method for transforming output of a control stick according to examples of the present disclosure.
Figure 8B:
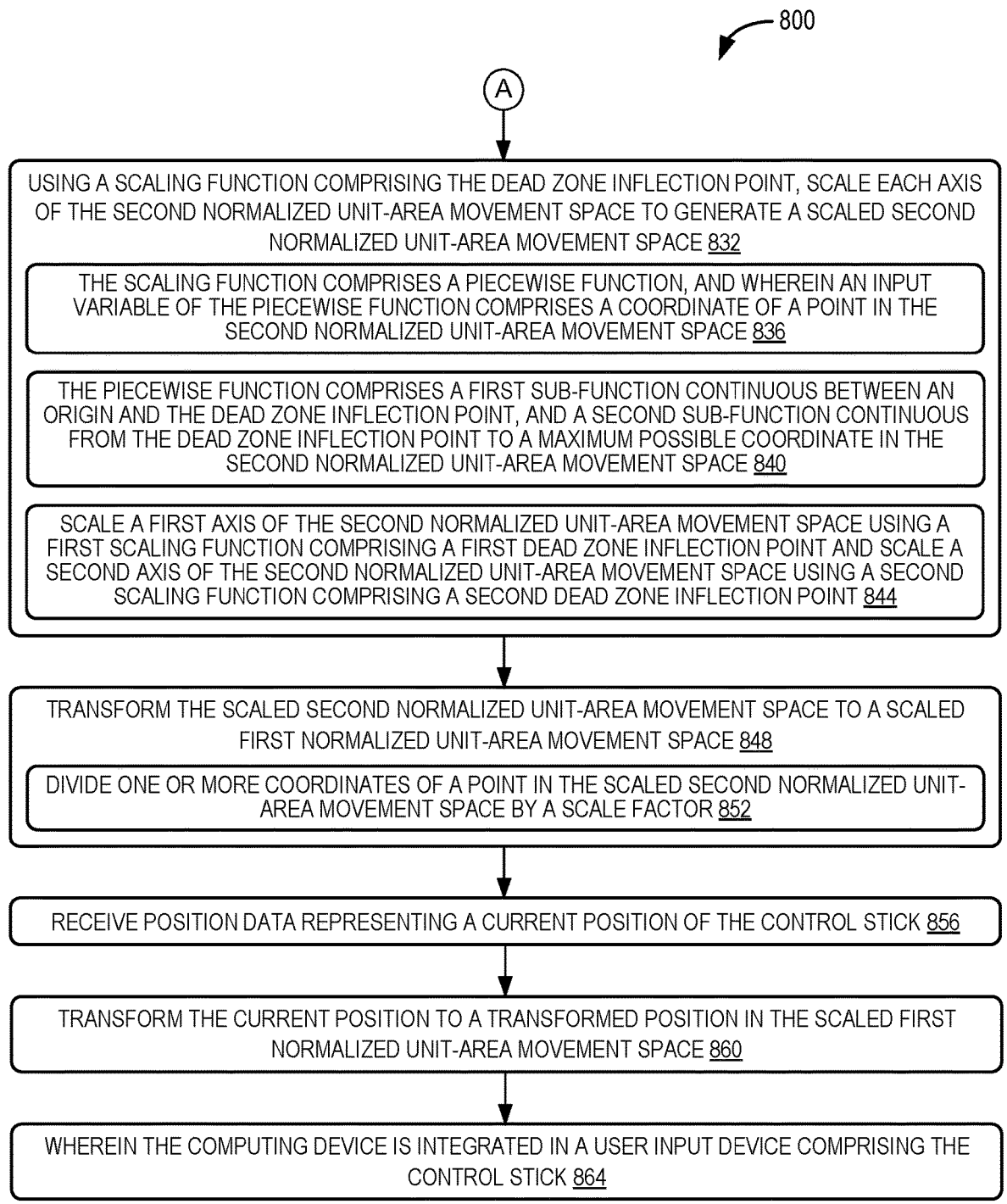

FIGS. 8A-8B illustrate a flow chart of a method 800 for transforming output of a control stick according to examples of the present disclosure. The following description of method 800 is provided with reference to the software and hardware components described above and shown in FIGS. 1-7. It will be appreciated that method 800 also may be performed in other contexts using other suitable hardware and software components.

With reference to FIG. 8A, at 804, the method 800 may include receiving a dead zone inflection point defining a boundary of a dead zone region and a playspace region within a first normalized unit-area movement space of the control stick. At 808, the method 800 may include the dead zone inflection point comprising a first coordinate corresponding to a return-to-center parameter of the control stick, and a second coordinate corresponding to a dimension of the dead zone region.

At 812, the method 800 may include mapping the first normalized unit-area movement space to a second normalized unit-area movement space. At 816, the method 800 may include multiplying one or more coordinates of a point in the first normalized unit-area movement space by a scale factor. At 820, the method 800 may include the scale factor having a value of one when any of the coordinates of the point has a value of zero. At 824, the method 800 may include the coordinates of a point comprise an x-axis coordinate and a y-axis coordinate, and when the absolute value of the x-axis coordinate is less than the absolute value of the y-axis coordinate, the scale factor comprising the square root of: the sum of one plus the squared x-coordinate divided by the squared y-coordinate. At 828, the method 800 may include the coordinates of a point comprise an x-axis coordinate and a y-axis coordinate, and when the absolute value of the y-axis coordinate is less than or equal to the absolute value of the x-axis coordinate, the scale factor comprising the square root of: the sum of one plus the squared y-coordinate divided by the squared x-coordinate.

With reference now to FIG. 8B, at 832, the method 800 may include using a scaling function comprising the dead zone inflection point, scaling each axis of the second normalized unit-area movement space to generate a scaled second normalized unit-area movement space. At 836, the method 800 may include the scaling function comprising a piecewise function, and wherein an input variable of the piecewise function comprises a coordinate of a point in the second normalized unit-area movement space. At 840, the method 800 may include the piecewise function comprises a first sub-function continuous between an origin and the dead zone inflection point, and a second sub-function continuous from the dead zone inflection point to a maximum possible coordinate in the second normalized unit-area movement space. At 844, the method 800 may include scaling a first axis of the second normalized unit-area movement space using a first scaling function comprising a first dead zone inflection point and scaling a second axis of the second normalized unit-area movement space using a second scaling function comprising a second dead zone inflection point.

At 848, the method 800 may include transforming the scaled second normalized unit-area movement space to a scaled first normalized unit-area movement space. At 852, the method 800 may include dividing one or more coordinates of a point in the scaled second normalized unit-area movement space by a scale factor.

At 856, the method 800 may include receiving position data representing a current position of the control stick. At 860, the method 800 may include transforming the current position to a transformed position in the scaled first normalized unit-area movement space. At 864, the method 800 may include wherein a computing device practicing the method is integrated in a user input device comprising the control stick.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
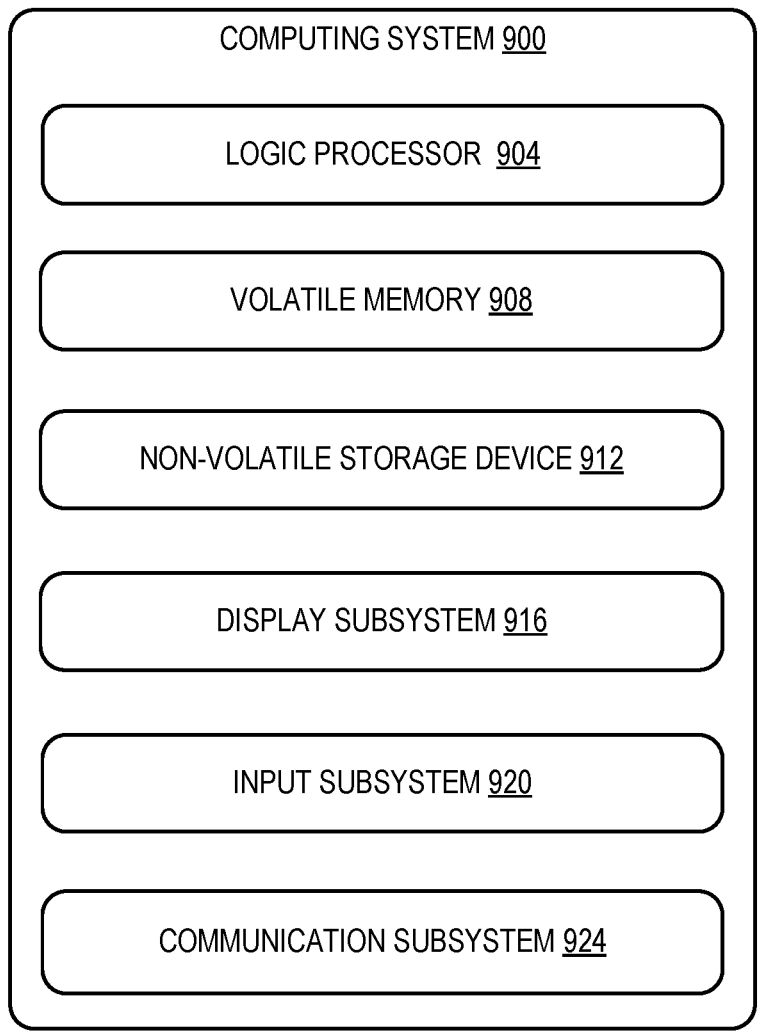
FIG. 9 shows a block diagram of an example computing device according to examples of the present disclosure.

FIG. 9 schematically shows a non-limiting embodiment of a computing system 900 that can enact one or more of the methods and processes described above. Computing system 900 is shown in simplified form. Computing system 900 may take the form of one or more gaming consoles, personal computers, server computers, tablet computers, home-entertainment computers, network computing devices, gaming devices, mobile computing devices, mobile communication devices (e.g., smart phones), and/or other computing devices, and wearable computing devices such as smart wristwatches and head mounted display devices. In the above examples, computing device 100 and computing device 120 may comprise computing system 900 or one or more aspects of computing system 900.

Computing system 900 includes a logic processor 904, volatile memory 908, and a non-volatile storage device 912. Computing system 900 may optionally include a display subsystem 916, input subsystem 920, communication subsystem 924, and/or other components not shown in FIG. 9.

Logic processor 904 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 904 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 912 includes one or more physical devices configured to hold instructions executable by the logic processors to implement the methods and processes described herein. When such methods and processes are implemented, the state of non-volatile storage device 912 may be transformed—e.g., to hold different data.

Non-volatile storage device 912 may include physical devices that are removable and/or built-in. Non-volatile storage device 912 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 912 may include nonvolatile, dynamic, static, read/write, read-only, sequential-access, location-addressable, file-addressable, and/or content-addressable devices. It will be appreciated that non-volatile storage device 912 is configured to hold instructions even when power is cut to the non-volatile storage device 912.

Volatile memory 908 may include physical devices that include random access memory. Volatile memory 908 is typically utilized by logic processor 904 to temporarily store information during processing of software instructions. It will be appreciated that volatile memory 908 typically does not continue to store instructions when power is cut to the volatile memory 908.

Aspects of logic processor 904, volatile memory 908, and non-volatile storage device 912 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 900 typically implemented in software by a processor to perform a particular function using portions of volatile memory, which function involves transformative processing that specially configures the processor to perform the function. Thus, a program or application may be instantiated via logic processor 904 executing instructions held by non-volatile storage device 912, using portions of volatile memory 908. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

When included, display subsystem 916 may be used to present a visual representation of data held by non-volatile storage device 912. As the herein described methods and processes change the data held by the non-volatile storage device, and thus transform the state of the non-volatile storage device, the state of display subsystem 916 may likewise be transformed to visually represent changes in the underlying data. Display subsystem 916 may include one or more display devices utilizing virtually any type of technology. Such display devices may be combined with logic processor 904, volatile memory 908, and/or non-volatile storage device 912 in a shared enclosure, or such display devices may be peripheral display devices.

When included, input subsystem 920 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 924 may be configured to communicatively couple various computing devices described herein with each other, and with other devices. Communication subsystem 924 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides, at a computing device, a method for transforming output of a control stick, the method comprising: receiving a dead zone inflection point defining a boundary of a dead zone region and a playspace region within a first normalized unit-area movement space of the control stick, mapping the first normalized unit-area movement space to a second normalized unit-area movement space, using a scaling function comprising the dead zone inflection point, scaling each axis of the second normalized unit-area movement space to generate a scaled second normalized unit-area movement space, transforming the scaled second normalized unit-area movement space to a scaled first normalized unit-area movement space, receiving position data representing a current position of the control stick, and transforming the current position to a transformed position in the scaled first normalized unit-area movement space.

The method may additionally or alternatively include, wherein the dead zone inflection point comprises a first coordinate corresponding to a return-to-center parameter of the control stick, and a second coordinate corresponding to a dimension of a dead zone region.

The method may additionally or alternatively include, wherein mapping the first normalized unit-area movement space to the second normalized unit-area movement space comprises multiplying one or more coordinates of a point in the first normalized unit-area movement space by a scale factor. The method may additionally or alternatively include, wherein the scale factor has a value of one when any of the coordinates of the point has a value of zero.

The method may additionally or alternatively include, wherein the coordinates of the point comprise an x-axis coordinate and a y-axis coordinate, and wherein when the absolute value of the x-axis coordinate is less than the absolute value of the y-axis coordinate, the scale factor comprises the square root of: the sum of one plus the squared x-coordinate divided by the squared y-coordinate. The method may additionally or alternatively include, wherein the coordinates of the point comprise an x-axis coordinate and a y-axis coordinate, and wherein when the absolute value of the y-axis coordinate is less than or equal to the absolute value of the x-axis coordinate, the scale factor comprises the square root of: the sum of one plus the squared y-coordinate divided by the squared x-coordinate.

The method may additionally or alternatively include, wherein transforming the scaled second normalized unit-area movement space to the scaled first normalized unit-area movement space comprises dividing one or more coordinates of a point in the scaled second normalized unit-area movement space by a scale factor.

The method may additionally or alternatively include, wherein the scaling function comprises a piecewise function, and wherein an input variable of the piecewise function comprises a coordinate of a point in the second normalized unit-area movement space. The method may additionally or alternatively include, wherein the piecewise function comprises a first sub-function continuous between an origin and the dead zone inflection point, and a second sub-function continuous from the dead zone inflection point to a maximum possible coordinate in the second normalized unit-area movement space.

The method may additionally or alternatively include, wherein scaling each axis of the second normalized unit-area movement space comprises scaling a first axis of the second normalized unit-area movement space using a first scaling function comprising a first dead zone inflection point and scaling a second axis of the second normalized unit-area movement space using a second scaling function comprising a second dead zone inflection point.

The method may additionally or alternatively include, wherein the computing device is integrated in a user input device comprising the control stick.

Another aspect provides a user input device, comprising: a control stick configured to receive an input from a user along one or more axes, and a processor configured to: receive a dead zone inflection point defining a boundary of a dead zone region and a playspace region within a first normalized unit-area movement space of the control stick, map the first normalized unit-area movement space to a second normalized unit-area movement space, using a scaling function comprising the dead zone inflection point, scale each axis of the second normalized unit-area movement space to generate a scaled second normalized unit-area movement space, transform the scaled second normalized unit-area movement space to a scaled first normalized unit-area movement space, receive position data representing a current position of the control stick, and transform the current position to a transformed position in the scaled first normalized unit-area movement space.

The user input device may additionally or alternatively include, wherein mapping the first normalized unit-area movement space to the second normalized unit-area movement space comprises multiplying one or more coordinates of a point in the first normalized unit-area movement space by a scale factor.

The user input device may additionally or alternatively include, wherein the coordinates of the point comprise an x-axis coordinate and a y-axis coordinate, and wherein when the absolute value of the x-axis coordinate is less than the absolute value of the y-axis coordinate, the scale factor comprises the square root of: the sum of one plus the squared x-coordinate divided by the squared y-coordinate. The user input device may additionally or alternatively include, wherein the coordinates of the point comprise an x-axis coordinate and a y-axis coordinate, and wherein when the absolute value of the y-axis coordinate is less than or equal to the absolute value of the x-axis coordinate, the scale factor comprises the square root of: the sum of one plus the squared y-coordinate divided by the squared x-coordinate.

The user input device may additionally or alternatively include, wherein scaling each axis of the second normalized unit-area movement space comprises scaling a first axis of the second normalized unit-area movement space using a first scaling function comprising a first dead zone inflection point and scaling a second axis of the second normalized unit-area movement space using a second scaling function comprising a second dead zone inflection point.

The user input device may additionally or alternatively include, wherein transforming the scaled second normalized unit-area movement space to the scaled first normalized unit-area movement space comprises dividing one or more coordinates of a point in the scaled second normalized unit-area movement space by a scale factor.

The user input device may additionally or alternatively include, wherein the scaling function comprises a piecewise function, and wherein an input variable of the piecewise function comprises a coordinate of a point in the second normalized unit-area movement space. The user input device may additionally or alternatively include, wherein the piecewise function comprises a first sub-function continuous between an origin and the dead zone inflection point, and a second sub-function continuous from the dead zone inflection point to a maximum possible coordinate in the second normalized unit-area movement space.

Another aspect provides, at a user input device comprising a control stick and a computing device, a method for transforming output of the control stick, the method comprising: receiving a dead zone inflection point defining a boundary of a dead zone region and a playspace region within a first normalized unit-area movement space of the control stick, mapping the first normalized unit-area movement space of the control stick to a second normalized unit-area movement space of the control stick by at least multiplying coordinates of a point in the first normalized unit-area movement space by a scale factor, using a scaling function comprising the dead zone inflection point, scaling each axis of the second normalized unit-area movement space to generate a scaled second normalized unit-area movement space, transforming the scaled second normalized unit-area movement space to a scaled first normalized unit-area movement space, receiving position data representing a current position of the control stick, and transforming the current position to a transformed position in the scaled first normalized unit-area movement space.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method for transforming output of a control stick, the method comprising:
receiving a dead zone inflection point defining a boundary of a dead zone region and a playspace region within a first normalized unit-area movement space of the control stick;
mapping the first normalized unit-area movement space to a second normalized unit-area movement space by multiplying one or more coordinates of a point in the first normalized unit-area movement space by a first scale factor;
using a scaling function comprising the dead zone inflection point, scaling each axis of the second normalized unit-area movement space by applying the scaling function to each axis of the second normalized unit-area movement space independently to generate a scaled second normalized unit-area movement space;
transforming the scaled second normalized unit-area movement space to a scaled first normalized unit-area movement space by dividing one or more coordinates of a point in the scaled second normalized unit-area movement space by a second scale factor;
receiving position data representing a current position of the control stick; and
transforming the current position to a transformed position in the scaled first normalized unit-area movement space.

2. The method of claim 1, wherein the dead zone inflection point comprises a first coordinate corresponding to a return-to-center parameter of the control stick, and a second coordinate corresponding to a dimension of a dead zone region.

3. The method of claim 1, wherein the first scale factor has a value of one when any of the coordinates of the point in the first normalized unit-area movement space has a value of zero.

4. The method of claim 1, wherein the coordinates of the point in the first normalized unit-area movement space comprise an x-axis coordinate and a y-axis coordinate, and wherein when the absolute value of the x-axis coordinate is less than the absolute value of the y-axis coordinate, the first scale factor comprises the square root of: the sum of one plus the squared x-coordinate divided by the squared y-coordinate.

5. The method of claim 1, wherein the coordinates of the point in the first normalized unit-area movement space comprise an x-axis coordinate and a y-axis coordinate, and wherein when the absolute value of the y-axis coordinate is less than or equal to the absolute value of the x-axis coordinate, the first scale factor comprises the square root of: the sum of one plus the squared y-coordinate divided by the squared x-coordinate.

6. The method of claim 1, wherein the scaling function comprises a piecewise function, and wherein an input variable of the piecewise function comprises a coordinate of a point in the second normalized unit-area movement space.

7. The method of claim 6, wherein the piecewise function comprises a first sub-function continuous between an origin and the dead zone inflection point, and a second sub-function continuous from the dead zone inflection point to a maximum possible coordinate in the second normalized unit-area movement space.

8. The method of claim 1, wherein scaling each axis of the second normalized unit-area movement space comprises scaling a first axis of the second normalized unit-area movement space using a first scaling function comprising a first dead zone inflection point and scaling a second axis of the second normalized unit-area movement space using a second scaling function comprising a second dead zone inflection point.

9. The method of claim 1, wherein the computing device is integrated in a user input device comprising the control stick.

10. The method of claim 1, wherein mapping the first normalized unit-area movement space to the second normalized unit-area movement space comprises mapping a circular first normalized unit-area movement space to a square second normalized unit-area movement space.

11. The method of claim 1, wherein the scaled first normalized unit-area movement space comprises a circular movement space.

12. The method of claim 1, further comprising calculating the first scale factor and the second scale factor using a same function.

13. The method of claim 1, wherein the scaled first normalized unit-area movement space preserves a perimeter of the first normalized unit-area movement space.

14. A user input device, comprising:
a control stick configured to receive an input from a user along one or more axes; and
a processor configured to:
receive a dead zone inflection point defining a boundary of a dead zone region and a playspace region within a first normalized unit-area movement space of the control stick;
map the first normalized unit-area movement space to a second normalized unit-area movement space by multiplying one or more coordinates of a point in the first normalized unit-area movement space by a first scale factor;
using a scaling function comprising the dead zone inflection point, scale each axis of the second normalized unit-area movement space by applying the scaling function to each axis of the second normalized unit-area movement space independently to generate a scaled second normalized unit-area movement space;
transform the scaled second normalized unit-area movement space to a scaled first normalized unit-area movement space by dividing one or more coordinates of a point in the scaled second normalized unit-area movement space by a second scale factor;
receive position data representing a current position of the control stick; and
transform the current position to a transformed position in the scaled first normalized unit-area movement space.

15. The device of claim 14, wherein the coordinates of the point in the first normalized unit-area movement space comprise an x-axis coordinate and a y-axis coordinate, and wherein when the absolute value of the x-axis coordinate is less than the absolute value of the y-axis coordinate, the first scale factor comprises the square root of: the sum of one plus the squared x-coordinate divided by the squared y-coordinate.

16. The device of claim 14, wherein the coordinates of the point in the first normalized unit-area movement space comprise an x-axis coordinate and a y-axis coordinate, and wherein when the absolute value of the y-axis coordinate is less than or equal to the absolute value of the x-axis coordinate, the first scale factor comprises the square root of: the sum of one plus the squared y-coordinate divided by the squared x-coordinate.

17. The device of claim 14, wherein scaling each axis of the second normalized unit-area movement space comprises scaling a first axis of the second normalized unit-area movement space using a first scaling function comprising a first dead zone inflection point and scaling a second axis of the second normalized unit-area movement space using a second scaling function comprising a second dead zone inflection point.

18. The device of claim 14, wherein the scaling function comprises a piecewise function, and wherein an input variable of the piecewise function comprises a coordinate of a point in the second normalized unit-area movement space.

19. The device of claim 18, wherein the piecewise function comprises a first sub-function continuous between an origin and the dead zone inflection point, and a second sub-function continuous from the dead zone inflection point to a maximum possible coordinate in the second normalized unit-area movement space.

20. At a user input device comprising a control stick and a computing device, a method for transforming output of the control stick, the method comprising:
receiving a dead zone inflection point defining a boundary of a dead zone region and a playspace region within a first normalized unit-area movement space of the control stick;
mapping the first normalized unit-area movement space of the control stick to a second normalized unit-area movement space of the control stick by at least multiplying coordinates of a point in the first normalized unit-area movement space by a first scale factor;
using a scaling function comprising the dead zone inflection point, scaling each axis of the second normalized unit-area movement space to generate a scaled second normalized unit-area movement space by applying the scaling function to each axis of the second normalized unit-area movement space independently;
transforming the scaled second normalized unit-area movement space to a scaled first normalized unit-area movement space by dividing one or more coordinates of a point in the scaled second normalized unit-area movement space by a second scale factor;
receiving position data representing a current position of the control stick; and transforming the current position to a transformed position in the scaled first normalized unit-area movement space.

* * * * *